No. 822,723. PATENTED JUNE 5, 1906.
R. CONRAD.
BALL BEARING.
APPLICATION FILED FEB. 23, 1904.

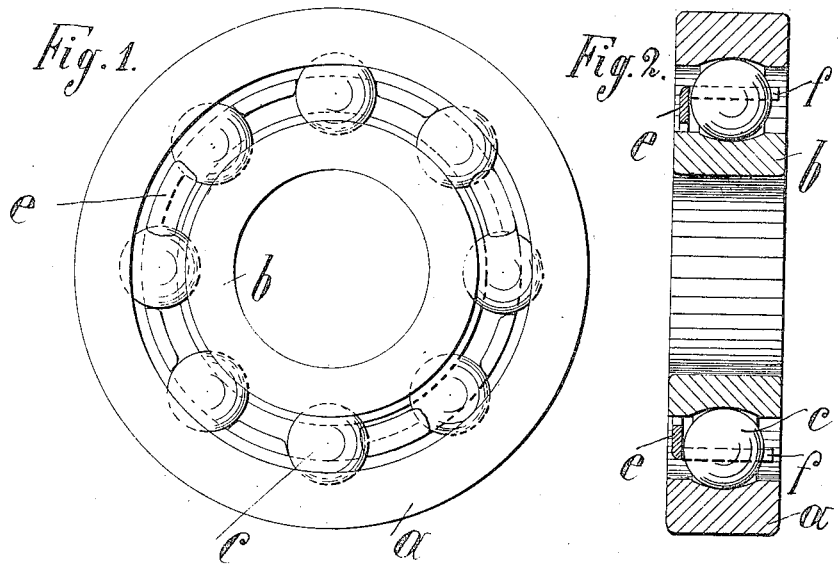
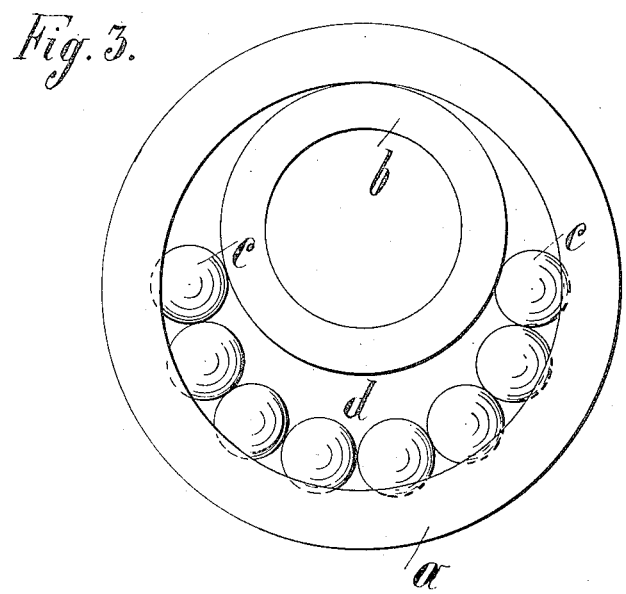

2 SHEETS—SHEET 2.

WITNESSES:
W. M. Avery
H. C. Davis

INVENTOR
Robert Conrad
BY
Munn
ATTORNEYS.

UNITED STATES PATENT OFFICE.

ROBERT CONRAD, OF BERLIN, GERMANY.

BALL-BEARING.

No. 822,723.  Specification of Letters Patent.  Patented June 5, 1906.

Application filed February 23, 1904. Serial No. 194,894.

*To all whom it may concern:*

Be it known that I, ROBERT CONRAD, civil engineer, a subject of the Emperor of Austria-Hungary, residing at 248 Kurfurstondamm, in the city of Berlin, Kingdom of Prussia, German Empire, have invented certain new and useful Improvements in Ball-Bearings, of which the following is a specification.

This invention provides a ball-bearing having concentric-grooved rings, the sides of the grooves being uninterrupted throughout their circumference and the parts being so proportioned and designed that the balls may be admitted to the grooved space by displacing the rings relatively to each other. The term "ball-bearings" is to be understood as including various other known equivalent devices rolling between the rings.

The principal advantage of the new bearing lies in the continuity of the sides of the groove, which insures the regular running of the balls, and consequently great durability of the bearing, and which also enables the bearing to support a greater pressure than bearings having an interruption or recess for inserting balls through the side of the ring.

Other features of improvement are referred to in detail hereinafter.

The accompanying drawings illustrate embodiments of the invention.

Figure 4:
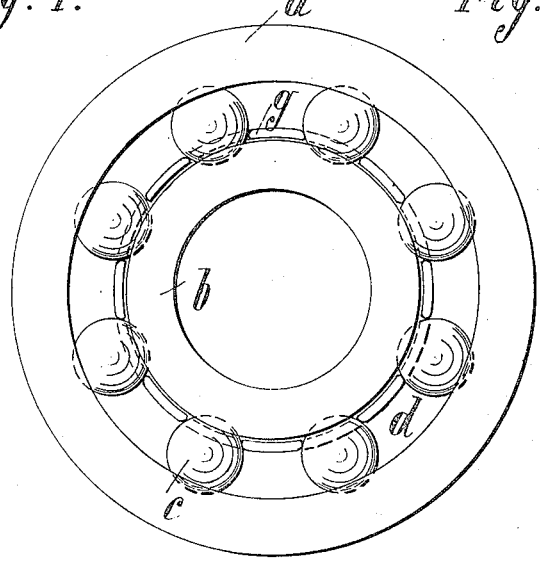
Figure 5:
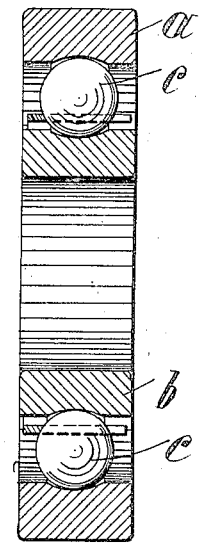
Figure 6:
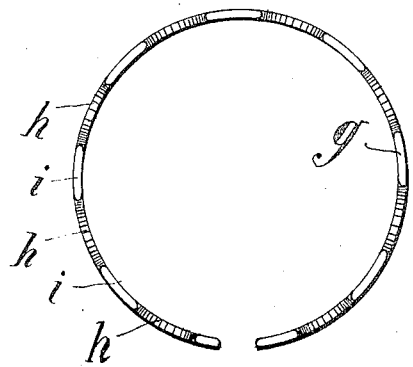
Figure 7:
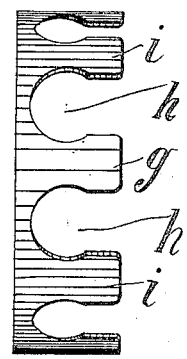
Figure 8:
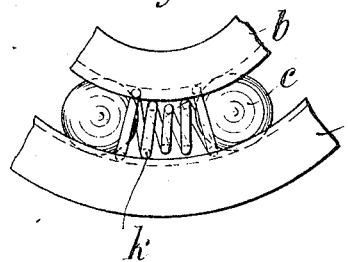

Figure 1 is a face view of complete bearing; Fig. 2, a diametrical section of Fig. 1; Fig. 3, a face view showing the manner of introducing the balls. Figs. 4 and 5 are views similar to views 1 and 2, showing the modified construction. Fig. 6 is a face view, and Fig. 7 an edge view, of the cage used in Figs. 4 and 5. Fig. 8 is a face view of another modification.

Referring to the embodiment of the invention illustrated, the two concentric rings $a$ and $b$ have between them a number of balls $c$ or equivalent rolling devices. Each ring has a groove the sides of which overhang the balls to a slight extent. The sides of the grooves and, in fact, all the parts of each ring are continuous and practically integral throughout the entire length of the ring. In the normal position of the parts the balls cannot escape, the space between the sides of the grooves being slightly less than the diameter of the balls. Similarly the balls hold the two rings together against axial displacement, so that all the parts are held together and form a unitary device. The edges of the rings, however, are spaced so far apart from each other that they may be displaced eccentrically relatively to each other in the manner shown in Fig. 3, leaving a crescent-shaped space of sufficient width to permit the introduction of a limited number of balls. The crescent-shaped space is marked $d$. The rings may be then restored to their concentric position and spreaders or distributing devices introduced into the spaces between the balls, so as to distribute them entirely around the raceway and to prevent their return to a position such as Fig. 3, which would permit the escape of the balls.

The number of balls which can be introduced may be increased by effecting a slight elastic deformation or tilting and at the same time pressing an additional ball between the others.

The exact shape of the groove is not material. It will depend upon the shape of the ball or rolling device or on various other conditions. The spacers also may be of various designs, many of which are known in connection with ball-bearings of other types, where, however, they do not serve the same function of retaining all the parts together in a unitary whole.

In Figs. 1 and 2 the spacers $f$ are connected to each other by a ring $e$, so as to form a cage. One or two of the spacers $f$ are made of extra length and bent over at the end in order to prevent the cage from being removed in an axial direction. It will be seen that the spacers $f$ hold the balls in the position of Fig. 1—that is to say, in the distributed position—preventing the balls from running together, and thus allowing one of the rings to fall down against the other and release the balls through the crescent-shaped space. In Figs. 4 to 7 are shown spacers of another type. These spacers are in the form of arms projecting from a ring; but in this case a split ring $g$ is employed, and the arms $i$ at their juncture at the ring are reduced to form recesses $h$, with overhanging edges. To insert these spacers, the ring is compressed and inserted near the innermost points of the balls, so that the overhanging arms $i$ may pass between the balls. The ring being then released expands, so that the balls are caught in the recesses $h$ and hold the cage in place.

Instead of the solid spacers shown yielding spacers may be employed, and the spacers may be connected to or disconnected from each other. For example, in Fig. 8 there is shown a separate and yielding spacer in the form of the spiral spring *k*, which upon being compressed may be introduced into the groove or withdrawn therefrom between the overhanging edges of the groove.

I do not claim in the present application the described method of assembling the parts of my improved ball-bearing, this method being claimed in a divisional application filed May 18, 1906.

Having now described the nature of my invention and in which manner the same is to be performed, what I claim, and desire to secure by Letters Patent of the United States, is—

1. A ball-bearing including two concentric rings having opposing grooves on their adjacent faces, the sides of said grooves being uninterrupted throughout their circumference and adapted to admit balls to the grooved space between them by displacement of the rings eccentrically to each other.

2. A ball-bearing including two concentric rings having opposing grooves on their adjacent faces, the sides of said grooves engaging the balls to prevent substantial lateral movement, said sides being uninterrupted throughout their circumference and adapted to admit balls to the grooved space between them by displacement of the rings eccentrically to each other.

3. A ball-bearing including two concentric rings having opposing grooves on their adjacent faces, the sides of said grooves engaging the balls to prevent substantial lateral movement, and said rings being adapted to admit a limited number of balls to the grooved space between them by displacement of the rings, and means for distributing the balls around the entire length of the grooves.

4. A ball-bearing including two concentric rings having opposing grooves on their adjacent faces, the sides of said grooves engaging the balls to prevent substantial lateral movement, and said rings being adapted to admit a limited number of balls to the grooved space between them by displacement of the rings, and separating devices one between each pair of balls, said separating devices being connected to each other.

5. A ball-bearing including two concentric rings having opposing grooves on their adjacent faces, the sides of said grooves engaging the balls to prevent substantial lateral movement, and said rings being adapted to admit a limited number of balls to the grooved space between them by displacement of the rings, and yielding means for separating the balls.

6. A ball-bearing including two concentric rings having opposing grooves on their adjacent faces, the sides of said grooves engaging the balls to prevent substantial lateral movement, and said rings being adapted to admit a limited number of balls to the grooved space between them by displacement of the rings, and separators adapted to be inserted between the balls when the rings are in their normal concentric position.

7. A ball-bearing including two concentric rings having opposing grooves on their adjacent faces, the sides of said grooves engaging the balls to prevent substantial lateral movement, and said rings being adapted to admit a limited number of balls to the grooved space between them by displacement of the rings, and separators adapted to be deformed to permit their insertion between the balls when the rings are in concentric position.

8. A bearing comprising two concentric rings, balls between said rings, each ring having a groove both sides of which overhang said balls and are continuous and practically integral throughout their circumference, the number of balls being such that they can be inserted in the space between the rings when the latter are displaced from their normal position, and means for distributing the balls throughout the length of the groove, whereby the two rings are held together against axial displacement by the engagement of the balls with the overhanging walls of the grooves and the parts are held together so as to form a unitary device.

9. A bearing comprising two concentric rings, *a* and *b*, balls *c* between said rings, each ring having a groove both sides of which overhang said balls and are continuous and practically integral throughout their circumference, the edges of said sides being separated so far from each other that by displacing the rings eccentrically a limited number of balls may be inserted between them, and distributing devices adapted to be introduced between said edges and into the spaces between said balls when the rings are restored to concentric position, whereby the two rings are held together against axial displacement by the engagement of the balls with the overhanging walls of the grooves and the parts are held together so as to form a unitary device.

In witness whereof I have hereunto signed my name in the presence of two subscribing witnesses.

ROBERT CONRAD.

Witnesses:
 HENRY HASPER,
 WOLDEMAR HAUPT.